UNITED STATES PATENT OFFICE.

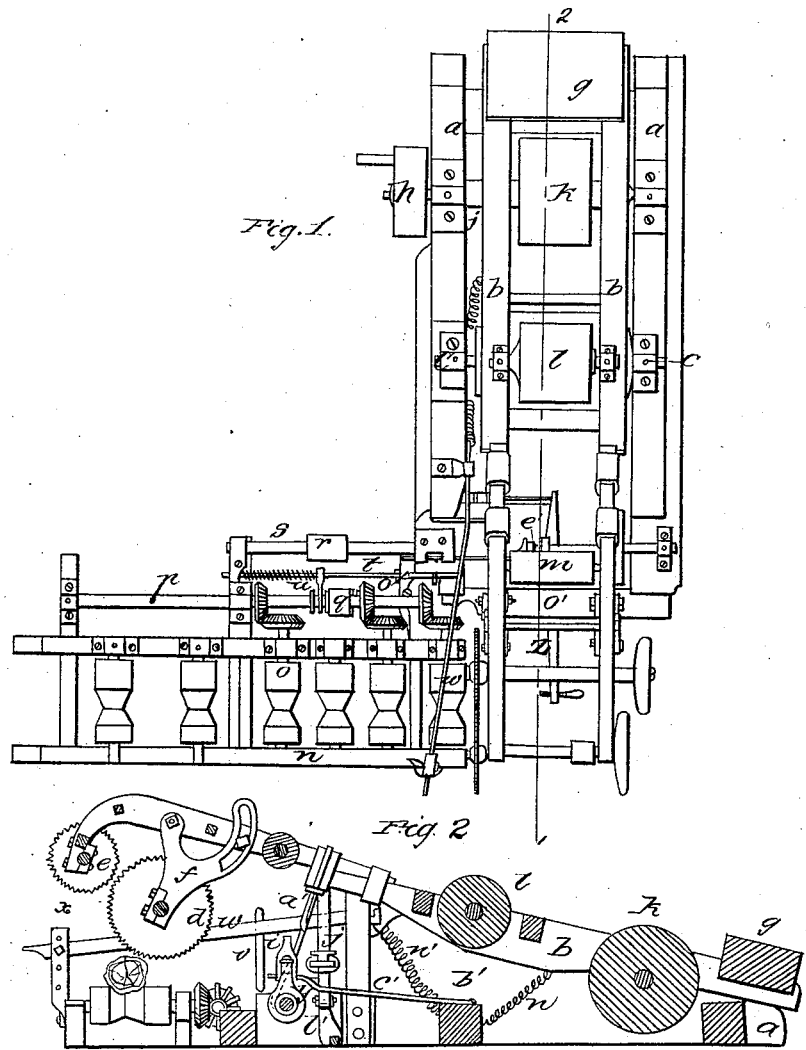
F. Field,
Circular Saw.
N° 13,351.   Patented July 31, 1855.

FREDERICK FIELD, OF TOLEDO, OHIO.

CROSSCUT-SAWING MACHINE.

Specification of Letters Patent No. 13,351, dated July 31, 1855.

*To all whom it may concern:*

Be it known that I, FREDERICK FIELD, of Toledo, in the county of Lucas and State of Ohio, have invented certain new and useful Improvements in Machines for Sawing Logs into Blocks for Stave-Timber, Shingle-Bolts, Wagon-Hubs, Fire-Wood, &c.; and I do hereby declare that the following is a full, clear, and exact description of the same, reference being had to the accompanying drawings, making a part of this specification, in which—

Figure 1 is a top view. Fig. 2 is a vertical section in the line 1—2 of Fig. 1.

The letters of reference, indicate the same parts in the different figures wherever they occur.

I construct a bed frame $a$ which may rest upon the ground, or be placed upon wheels, this frame affords bearings for the gudgeons ($c$) of the walking frame $b$ which sustains at one end the shafts of two circular saws $d$ and $e$ running in the same vertical plane, and provided with suitable balance wheels; the shaft of $d$ being hung upon adjustable arms, $f$, capable of adjustment by means of a bolt in the slot $i$ to compensate for the wear of the saws. Upon the opposite end of the frame $b$ is attached a counterbalance weight ($g$) aided by the spring $h$ if required.

The driving wheel $h$ is keyed to a shaft $j$ having its bearings in the frame $a$ and carries a fixed pulley $k$ connected by a band with the pulley $l$, which has its bearings in the frame, $b$, concentric with the gudgeons $c$, which position enables it to transmit motion by means of bands to the saw $d$ and through the medium of the pulley $m$ to the saw, $e$, without altering the tension of the bands in any position of the walking frame $b$.

Attached to the bed frame $a$, and at right angles therewith, is a frame or logway $n$, in which are journals of the notched feed rollers, $o$, upon which the log is placed. Parallel to the frame, $n$, and journaled upon prolongations of the cross pieces thereof, is a feed shaft ($p$); furnished with bevel gearing, which takes into corresponding bevel wheels upon the journals of several of the feed rollers, $o$; this shaft has also a loose pulley, and clutch ($q$), and receives its motion (when in gear) from the pulley $r$ by means of a band, which pulley is fixed upon the main feed shaft $s$. A sliding bar ($t$) furnished with a spiral spring, and an arm ($u$), serves to keep the pulley $q$ in gear when relieved from any pressure against its upward bent portion $v$, by the long levels $w$ (which has an adjustable fulcrum in the upright $x$). A cylinder pulley ($y$) furnished with suitable projections taking into a clutch, runs upon the main feed shaft $s$, and being in gear, and the machinery set in motion from its position in Fig. 2, draws down the end of the walking frame, $b$ (to which the saws are attached) by means of a cord or chain attached thereto and wound upon $y$, causing the saws to cut off a block from the log previously placed upon the ways, and touching the gage or set screw, in the lever L. When the saws have descended below the level of the log way and have cut off a block, an arm ($a'$) projecting downward from the frame $b$, and beveled off at its lower extremity comes in contact with one side of a lever $c'$ pivoted at $b'$, and connected at the other end with the fork that moves the clutch $e'$, and serving as a pivot to connect it with the bent lever $i'$, throwing the pulley $y$ out of gear, and allowing the counterpoise $g$ to elevate the saws to their former position; as the end of the frame rises the long lever $w$ being caught in a notch in the spring bar $j'$ depending from the frame $b$ is carried up, and being removed from the upright bar $v$, allows the spring clutch $q$ to throw the feed rollers into gear; the log then advances until it bears against the set screw on the lever L; this lever having its fulcrum at $o'$ acts upon a short lever $l'$ which throws the spring bar $j'$ back, disengaging the lever $w$ from its notch; the lever $w$ falls by its own gravity aided by the spring $n'$ and striking upon the bent portion of the lever $i'$ throws the cylinder pulley $y$ into gear, and at the same time throws the feed shaft $p$ out of gear by striking the bar $v$, and then rests upon the log to steady it while being sawed. The operations above described are then repeated, the machine requiring only an attendant to supply fresh logs, and to remove the blocks when sawed.

What I claim as my invention is—

The arrangement of the two circular saws hung in a vibrating frame operating and operated substantially in the manner set forth in combination, with the mode substantially as described of throwing the feed motion in and out of gear.

FREDERICK FIELD.

Witnesses:
L. CAMPBELL,
JOHN C. SMITH.